(12) United States Patent
Hashimoto

(10) Patent No.: US 9,169,764 B2
(45) Date of Patent: Oct. 27, 2015

(54) HYBRID VEHICLE

(71) Applicant: Keita Hashimoto, Toyota (JP)

(72) Inventor: Keita Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 14/045,248

(22) Filed: Oct. 3, 2013

(65) Prior Publication Data
US 2014/0109556 A1 Apr. 24, 2014

(30) Foreign Application Priority Data
Oct. 23, 2012 (JP) .................. 2012-233645

(51) Int. Cl.
| F01N 3/10 | (2006.01) |
| F01N 9/00 | (2006.01) |
| B60K 6/28 | (2007.10) |
| B60L 3/00 | (2006.01) |
| B60L 3/04 | (2006.01) |
| B60L 11/12 | (2006.01) |
| B60L 11/14 | (2006.01) |

(Continued)

(52) U.S. Cl.
CPC ... *F01N 9/00* (2013.01); *B60K 6/28* (2013.01); *B60K 6/445* (2013.01); *B60L 3/0069* (2013.01); *B60L 3/04* (2013.01); *B60L 11/126* (2013.01); *B60L 11/14* (2013.01); *B60L 11/1816* (2013.01); *B60W 10/30* (2013.01); *B60W 20/1082* (2013.01); *B60W 20/50* (2013.01); *B60L 2220/42* (2013.01); *B60L 2240/421* (2013.01); *B60L 2240/441* (2013.01); *B60L 2240/547* (2013.01); *B60Y 2300/474* (2013.01); *Y02T 10/6217* (2013.01); *Y02T 10/6239* (2013.01); *Y02T 10/648* (2013.01); *Y02T 10/7005* (2013.01); *Y02T 10/7077* (2013.01); *Y02T 90/14* (2013.01)

(58) Field of Classification Search
USPC ........... 60/274, 277, 280, 284, 286, 300, 303; 180/65.21, 65.25, 65.26, 65.27, 65.28, 180/309
See application file for complete search history.

(56) References Cited

U.S. PATENT DOCUMENTS 8,423,221 B2 * 4/2013 Watanabe ................. 701/22
8,661,796 B2 * 3/2014 Yoshioka et al. ............. 60/300
(Continued)

FOREIGN PATENT DOCUMENTS

| JP | A-10-002215 | 1/1998 |
| JP | A-2009-274471 | 11/2009 |

(Continued)

*Primary Examiner* — Binh Q Tran
(74) *Attorney, Agent, or Firm* — Oliff PLC

(57) ABSTRACT

A hybrid vehicle equipped with an internal combustion engine and a motor-generator for running the vehicle, includes: a power storage device to be supplied to the motor-generator; a current leakage detection circuit detecting a decrease in insulation resistance, the current leakage detection circuit being electrically connected to a negative electrode of the power storage device; an electrical heated catalyst device; and a power supply device that converts electric power from the power storage device into energization power of the electrical heated catalyst device by a power conversion path passing through an insulating mechanism. The power supply device includes a switching device. The switching device is opened when the electrical heated catalyst device is energized, and is closed when the decrease in insulation resistance of the electrical heated catalyst device is detected.

7 Claims, 9 Drawing Sheets

(51) Int. Cl.
*B60L 11/18* (2006.01)
*B60K 6/445* (2007.10)
*B60W 10/30* (2006.01)
*B60W 20/00* (2006.01)

(56) References Cited

U.S. PATENT DOCUMENTS 8,875,487 B2 * 11/2014 Katsuta ................... 60/277
8,919,100 B2 * 12/2014 Verbrugge et al. ............ 60/286
2009/0277705 A1 11/2009 Ichikawa

FOREIGN PATENT DOCUMENTS

| | | | |
|---|---|---|---|
| JP | A-2009-274479 | 11/2009 | |
| JP | A-2011-172373 | 9/2011 | |
| WO | WO2010109304 | * 9/2010 | ............ 60/277 |

* cited by examiner

FIG. 10

| STATE | | S1# | 410 | 420 | AC/DC POWER CONVERTER 310 | DC/DC POWER CONVERTER 320 |
|---|---|---|---|---|---|---|
| WHEN EXTERNAL CHARGING IS PERFORMED | EHC IS ACTUATED | OFF | ON | ON | EHC POWER CONTROL (Vdc) | CHARGING POWER CONTROL (Vc, Ic) |
| | EHC IS NOT ACTUATED | OFF | OFF | OFF | CHARGING POWER CONTROL (Vdc → Vc, Ic) | |
| WHEN VEHICLE RUNS | EHC IS ACTUATED | OFF | ON | ON | STOP | EHC POWER CONTROL (Vdc) |
| | EHC IS NOT ACTUATED | OFF | OFF | OFF | STOP | STOP |
| WHEN EHC CURRENT LEAKAGE IS CHECKED | (EHC IS NOT ACTUATED) | ON | ON | ON | STOP | STOP |

HYBRID VEHICLE

INCORPORATION BY REFERENCE

The disclosure of Japanese Patent Application No. 2012-233645 filed on Oct. 23, 2012 including the specification, drawings and abstract is incorporated herein by reference in its entirety.

BACKGROUND OF THE INVENTION

1. Field of the Invention

The invention relates to a hybrid vehicle equipped with an internal combustion engine and a motor-generator for running the vehicle, and more particularly to a hybrid vehicle provided with an electrical heated catalyst (EHC) in an exhaust passage of the internal combustion engine.

2. Description of Related Art

A vehicle equipped with an internal combustion engine is typically provided with a catalyst for purifying the exhaust gas of the internal combustion engine. The catalyst cannot purify the exhaust gas sufficiently unless the activation temperature of the catalyst is reached. Accordingly, an EHC configured such that the catalyst can be heated by an electrical heater or the like has been suggested.

Japanese Patent Application Publication No. 2009-274479 (JP-2009-274479 A) discloses the configuration of an electric system used when an EHC is provided at a hybrid vehicle in which an on-board power storage device can be charged from a power source installed outside of the vehicle (referred to hereinbelow as "external power source"). The catalyst temperature in the EHC is raised by heat generation by energization during actuation. Charging of the onboard power storage device with an external power source will be referred to hereinbelow simply as "external charging".

JP-2009-274479 A discloses the configuration of an electric system for energizing an EHC by using a charger for external charging. More specifically, the configuration is disclosed in which the EHC is connected in parallel to the primary winding or secondary winding of a transformer in a charger constituted by an insulating power converter including the transformer.

Since the EHC is disposed in the exhaust passage of the engine, electrical abnormalities caused by the decrease in insulation resistance can occur under the effect of soot or water. In the configuration disclosed in JP-2009-274479 A, the insulation between the power storage device and the EHC can be ensured by connecting the EHC in parallel with the secondary winding of the transformer.

However, in the configuration disclosed in JP-2009-274479 A, the EHC is not provided with a circuit for detecting the decrease in insulation resistance (referred to hereinbelow as "current leakage detection circuit") when the vehicle is used. Therefore, where the insulation resistance of the EHC temporarily decreases under the effect of soot or water, it is possible that the occurrence of such decrease will not be detected.

Further, in order to detect the decrease in insulation resistance of the EHC with the circuit configuration ensuring the insulation between the power storage device and the EHC, it is necessary to install a current leakage detection circuit separately from the circuit system connected to the power storage device. As a result, the cost can be increased.

SUMMARY OF THE INVENTION

It is an objective of the invention to energize the EHC after electrically insulating the power storage device and the EHC in a hybrid vehicle equipped with the EHC and detect efficiently the decrease in insulation resistance of the EHC, while avoiding the increase in the number of circuits.

According to a first aspect of the invention, a hybrid vehicle equipped with an internal combustion engine and a motor-generator for running the vehicle includes a power storage device that stores electric power to be supplied to the motor-generator, a current leakage detection circuit for detecting a decrease in insulation resistance, an electrical heated catalyst device, for electrically heating a catalyst purifying exhaust gas discharged from the internal combustion engine, and a power supply device. The current leakage detection circuit is electrically connected to the negative electrode of the power storage device. The power supply device converts electric power from the power storage device into energization power of the electrical heated catalyst device by a power conversion path passing through an insulating mechanism. The insulating mechanism is configured such that electric energy is transferred after a primary side electrically connected to the power storage device and a secondary side electrically connected to the electrical heated catalyst device have been electrically insulated. The power supply device includes a switching device for electrically connecting the primary side and the secondary side of the insulating mechanism to each other. The switching device is opened when the electrical heated catalyst device is energized, and is closed when the decrease in insulation resistance of the electrical heated catalyst device is detected.

The hybrid vehicle according to the first aspect may further include a testing unit and a prohibiting unit. The testing unit verifies whether or not the insulation resistance has decreased by the current leakage detection circuit in an ON state of the switching device when the presence/absence of the decrease in insulation resistance of the electrical heated catalyst device is requested to be checked. The prohibiting unit prohibits the energization of the electrical heated catalyst device by the power supply device when the decrease in insulation resistance is detected by the testing unit.

The hybrid vehicle according to the first aspect may further include a testing unit and an allowing unit. The testing unit verifies whether or not the insulation resistance has decreased by the current leakage detection circuit in an ON state of the switching device when the presence/absence of the decrease in insulation resistance of the electrical heated catalyst device is requested to be checked. The allowing unit allows the energization of the electrical heated catalyst device by the power supply device when the decrease in insulation resistance is not detected by the testing unit.

According to a second aspect of the invention, a hybrid vehicle equipped with an internal combustion engine and a motor-generator for running the vehicle includes: a power storage device that stores electric power to be supplied to the motor-generator; a power receiving unit that receives electric power supplied from a power source located outside the vehicle; an electrical heated catalyst device for electrically heating a catalyst purifying exhaust gas discharged from the internal combustion engine; a current leakage detection circuit for detecting a decrease in insulation resistance; and a charger for performing alternating current/direct current (AC/DC) power conversion by which power received by the power receiving unit is converted into charging power of the power storage device when power is supplied from the power source, by a power conversion path passing through an insulating mechanism. The current leakage detection circuit is electrically connected to the negative electrode of the power storage device. The insulating mechanism is configured such that electric energy is transferred after a primary side electrically connected to the power receiving unit and a secondary side electrically connected to the power storage device have been electrically insulated. The charger includes first and second power lines, with a DC voltage being outputted therebetween, a first power conversion unit, and a switching device. The first and second power lines are electrically connected to the primary side of the insulating mechanism and the electrical heated catalyst device on the power conversion path. The first power conversion unit is configured to convert the power from the power storage device into the DC voltage to be outputted to the first and second power lines by partial reverse conversion with respect to the AC/DC power conversion in a case in which the electrical heated catalyst device is actuated when no power is supplied from the power source. The switching device is configured to electrically connect the primary side and the secondary side of the insulating mechanism to each other when a decrease in insulation resistance is detected when the electrical heated catalyst device is not energized.

The hybrid vehicle according to the second aspect may further include: a first cutoff mechanism disposed between the first power line and the electrical heated catalyst device; and a second cutoff mechanism disposed between the second power line and the electrical heated catalyst device.

The first power conversion unit may be configured to perform bidirectional power conversion between the power storage device and the first and second power lines. The charger may further include a second power conversion unit. The second power conversion unit may be configured to convert the AC power received by the power receiving unit into DC power and output the DC power between the first and second power lines so as to control the DC voltage between the first and second power lines to a target voltage, when power is supplied from the power source.

Further, the charger may be configured to control power supplied to the electrical heated catalyst device by controlling the DC voltage between the first and second power lines with the first power conversion unit, and control charging power of the power storage device with the second power conversion unit, in a case in which the electrical heated catalyst device is actuated when the power storage device is charged by the power source.

With those embodiments, in a hybrid vehicle equipped with an EHC, the EHC can be energized after electrically insulating the power storage device and the EHC from each other, and the decrease in insulation resistance of the EHC can be efficiently detected, while avoiding the increase in the number of circuits.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 illustrates the control of the bypass switch in the charger and the EHC relays shown in FIG. 9 in each vehicle state.

DETAILED DESCRIPTION OF EMBODIMENTS

Figure 1:
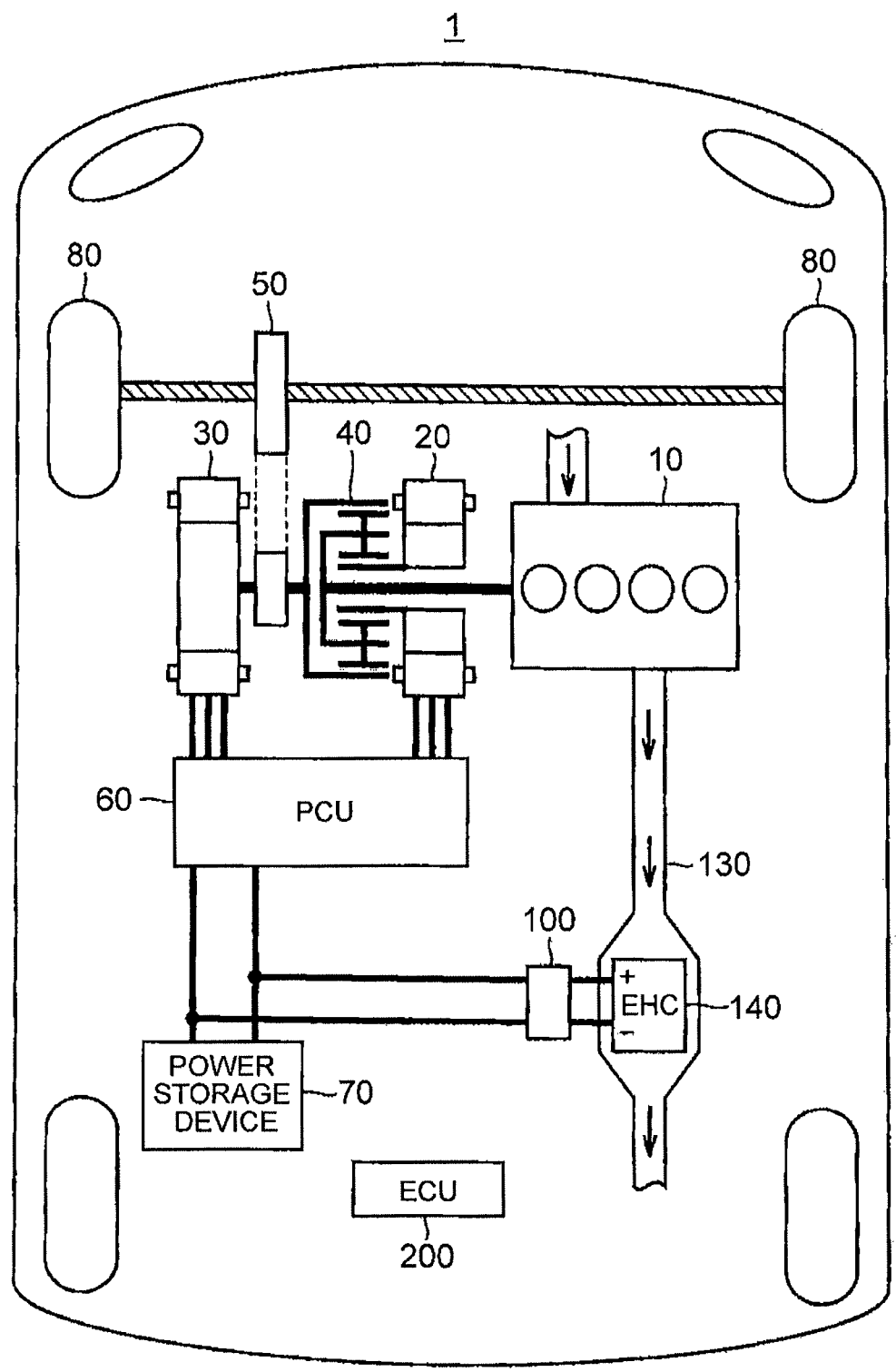
FIG. 1 is a block diagram illustrating the configuration of the hybrid vehicle according to Embodiment 1 of the invention.

The embodiments of the invention will be described below in greater detail with reference to the appended drawings. Like or corresponding components in the drawings are assigned with like reference symbols and the explanation thereof is not repeated.

Embodiment 1

FIG. 1 is a block diagram illustrating the configuration of the hybrid vehicle according to Embodiment 1 of the invention.

A hybrid vehicle 1 is equipped with an engine 10, a first motor-generator (MG) 20, a second MG 30, a power division device 40, a reducer 50, a power control unit (referred to hereinbelow as "PCU") 60, a power storage device 70, drive wheels 80, and an electronic control unit (referred to hereinbelow as "ECU") 200. The engine 10, first MG 20, and second MG 30 are connected to the power division device 40.

The hybrid vehicle 1 is driven by drive power outputted from at least either of the engine 10 and the second MG 30.

The engine 10 is an internal combustion engine that generates the drive power rotating a crankshaft by combustion energy generated by combustion of a gaseous mixture of air and fuel. The power generated by the engine 10 is divided into two paths by the power division device 40. Thus, in one path, the power is transmitted to the drive wheels 80 through the reducer 50, and in the other path, the power is transmitted to the first MG 20.

The first MG 20 and the second MG 30 are AC motor-generators and are configured, for example, of a three-phase synchronous motor-generator. The PCU 60 controls the output (revolution speed and/or torque) of the first MG 20 and the second MG 30 by performing bidirectional power conversion between the power storage device 70 and the first MG 20 and second MG 30.

The first MG 20 generates power by using the power of the engine 10 divided by the power division device 40. The power generated by the first MG 20 is converted by the PCU 60 from AC into DC and stored in the power storage device 70.

The second MG 30 generates drive power by using at least either of the electric power stored in the power storage device 70 and the electric power generated by the first MG 20. The drive power of the second MG 30 is transmitted to the drive wheels 80 through the reducer 50. In FIG. 1, front wheels are shown as the drive wheels 80, but the rear wheels may be also driven instead of or together with the front wheels by the second MG 30.

For example, when the vehicle is braked, the second MG 30 is driven by the drive wheels 80 through the reducer 50, and the second MG 30 operates as a generator. As a result, the second MG 30 also functions as a regenerative brake converting the kinetic energy of the vehicle into electric power. The electric power generated by the second MG 30 is stored in the power storage device 70.

The power division device 40 is constituted by planetary gears including a sun gear, a pinion gear, a carrier, and a ring gear. The pinion gear is meshed with the sun gear and the ring gear. The carrier rotatably supports the pinion gear and is connected to the crankshaft of the engine 10. The sun gear is connected to the rotating shaft of the first MG 20. The ring gear is connected to the rotating shaft of the second MG 30 and the reducer 50.

Figure 2:
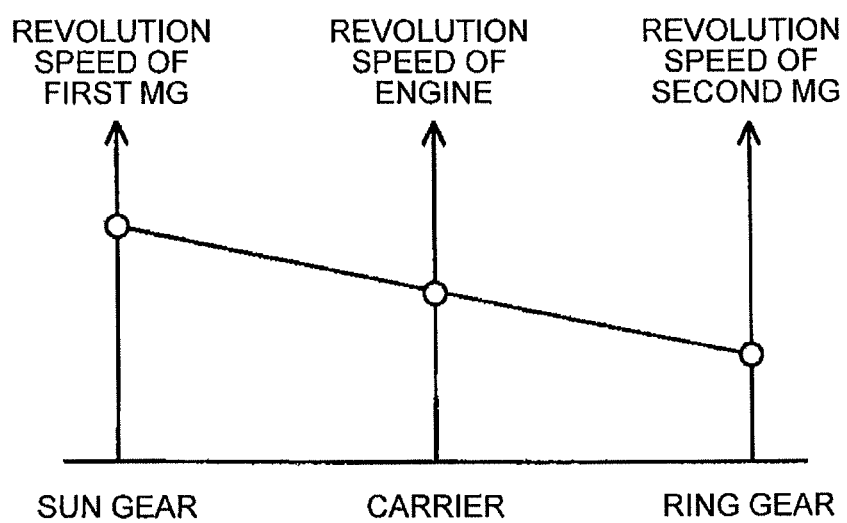
FIG. 2 is a common line diagram of the power division device shown in FIG. 1.

As a result of the engine 10, first MG 20, and second MG 30 being connected through the power division device 40 constituted by planetary gears, the revolution speeds of the engine 10, first MG 20, and second MG 30 are correlated with each other by a straight line in the common line diagram shown in FIG. 2.

Referring again to FIG. 1, the PCU 60 is controlled by a control signal from the ECU 200. The PCU 60 converts the DC power supplied from the power storage device 70 into AC power for driving the first MG 20 and the second MG 30. The PCU 60 outputs the converted AC power to the first MG 20 and the second MG 30. As a result, the first MG 20 and the second MG 30 are driven by the electric power stored in the power storage device 70. The PCU 60 can also convert the AC power generated by the first MG 20 and the second MG 30 into DC power and charge the power storage device 70 by the converted DC power.

The power storage device 70 is a DC power source storing the electric power for driving the first MG 20 and the second MG 30 and is configured, for example, by a secondary battery such as a nickel hydride battery or lithium ion battery. The output voltage of the power storage device 70 is a high voltage, for example, of 200 V. A high-capacity capacitor can be also used as the power storage device 70.

The hybrid vehicle 1 is also equipped with an exhaust passage 130. The exhaust gas discharged from the engine 10 is released to the atmosphere through the exhaust passage 130. An EHC 140 is provided in the intermediate section of the exhaust passage 130. The EHC 140 is a catalyst configured such that the catalyst can be electrically heated by an electric heater (electric resistance converting electric energy into thermal energy). For example, it is required that the EHC 140 be energized according to the catalyst temperature.

A power supply device 100 converts the output voltage of the power storage device 70 into a DC voltage Vdc for energizing the EHC 140. In the EHC 140, the catalyst temperature is raised by heat generated by the DC voltage Vdc from the power supply device 100. Where the electric resistance of the EHC 140 is denoted by R, the energization power of the EHC 140 is $(Vdc)^2/R$. Thus, by controlling the DC voltage Vdc, it is possible to control the energization power that determines the amount of heat generated by the EHC 140. A variety of conventional EHC can be used as the EHC 140.

The EHC 140 is required to be energized according to the catalyst temperature. For example, the EHC 140 is required to be energized when the catalyst temperature is, lower than a predetermined temperature as the vehicle operation is started or when the vehicle runs.

The ECU 200 incorporates a central processing unit (CPU) and a memory (not shown in the figure) and is configured to perform computational processing using the detection values from various sensors on the basis of the map and program stored in the memory. Alternatively, at least part of the ECU 200 may be configured to execute predetermined numerical and logical computational processing by hardware such as an electronic circuit.

The ECU 200 generates a control signal for controlling the devices mounted on the hybrid vehicle 1. In the configuration shown in FIG. 1, the ECU 200 outputs the control signal to the PCU 60 and the power supply device 100.

Figure 3:
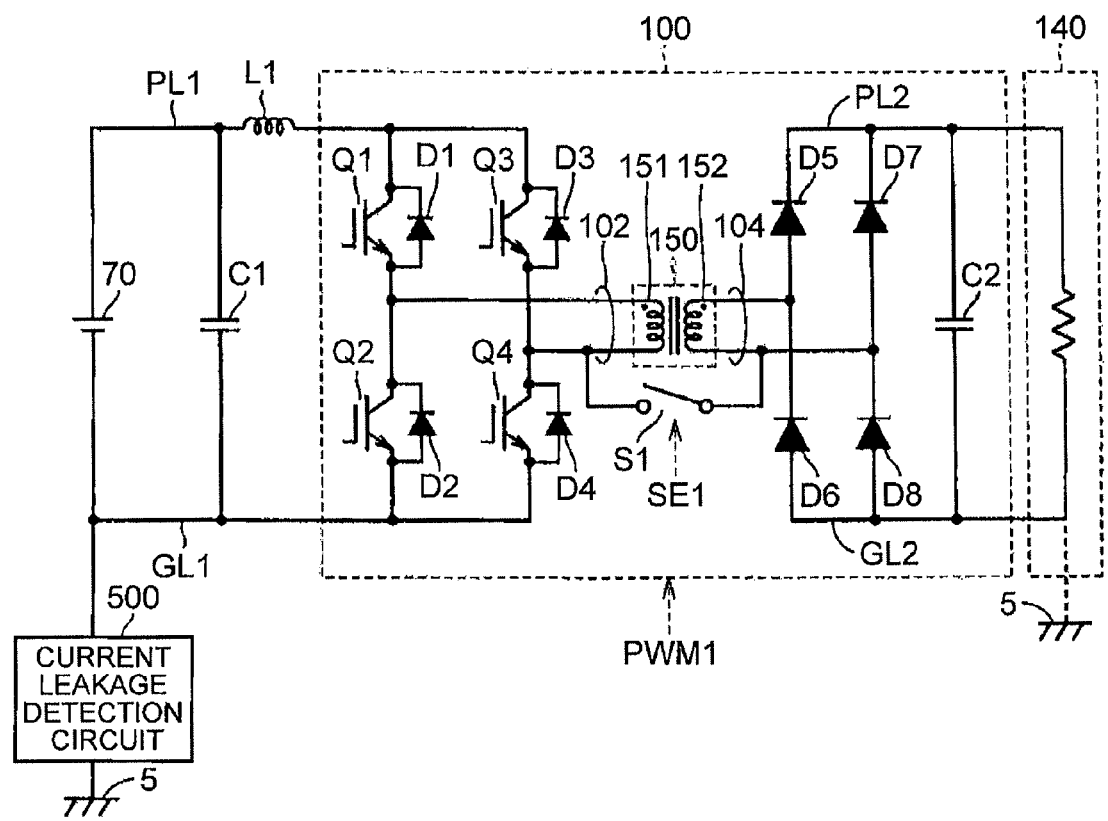
FIG. 3 is a circuit diagram for explaining the configuration of the system for supplying power to the EHC.

The configuration for supplying power to the EHC 140 will be explained hereinbelow with reference to FIG. 3. Referring to FIG. 3, the power storage device 70 is connected through a capacitor C1 and a reactor L1 to the power supply device 100 for feeding power to the EHC.

The power supply device 100 has power semiconductor switching elements Q1 to Q4 constituting a full bridge circuit, an insulating transformer 150, and diodes D5 to D8 constituting a diode bridge.

In FIG. 3, an insulated gate bipolar transistor (IGBT) is shown by way of example as the power semiconductor switching element (referred to hereinbelow simply as "switching element"), but a power metal oxide semiconductor (MOS) transistor or a power bipolar transistor can be also used. Antiparallel diodes D1 to D4 are disposed correspondingly to the switching elements Q1 to Q4, respectively.

A power line PL1 is electrically connected to the positive electrode of the power storage device 70, and a power line GL1 is electrically connected to the negative electrode of the power storage device 70. Therefore, a DC voltage corresponding to the output voltage of the power storage device 70 is applied between the power lines PL1 and GL1.

The full bridge circuit constituted by the switching elements Q1 to Q4 converts the DC voltage between the power lines PL1, GL1 into an AC voltage and outputs the converted voltage to a power line 102. The power line 102 is connected to the primary coil 151 of the insulating transformer 150.

The insulating transformer 150 has a core constituted by a magnetic material, and a primary coil 151 and a secondary coil 152 wound on the core. The primary coil 151 and the secondary coil 152 are electrically insulated from each other. In the insulating transformer 150, a voltage level is converted between the AC voltage of the primary coil 151 and the AC voltage of the secondary coil 152 according to the ratio of the number of turns in the primary coil 151 and the secondary coil 152. The secondary coil 152 of the insulating transformer 150 is connected to a power line 104.

The diodes D5 to D8 constituting the diode bridge convert the AC voltage appearing in the power line 104 into a DC voltage by full-wave rectification, and output the converted voltage to power lines PL2, GL2. The electric resistor for power generation that constitutes the EHC 140 is electrically connected between the power lines PL2, GL2.

By controlling the amplitude of the AC voltage appearing in the power line 102 by ON/OFF control of the switching elements Q1 to Q4, it is possible to control the DC voltage Vdc between the power lines PL2, GL2. Therefore, the ECU 200 shown in FIG. 1 generates a control signal PWM1 for ON/OFF control of the switching elements Q1 to Q4 correspondingly to the comparison result of the detected value of the DC voltage Vdc obtained with a sensor (not shown in the figure) and the target value of Vdc. The target value of the DC voltage Vdc can be set to a voltage value corresponding to the adequate energization power enabling the EHC 140 to demonstrate sufficient functions. By controlling the abovementioned DC voltage Vdc, it is possible to control adequately the energization power, that is, the amount of generated heat, in the EHC 140.

Since the primary side electrically connected to the power storage device 70 and the secondary side electrically connected to the EHC 140 are electrically insulated by the insulating transformer 150, the power supply device 100 converts the output power (DC voltage Vb) of the power storage device 70 into the energization voltage (DC voltage Vdc) of the EHC 140.

Since the power storage device 70 and the EHC 140 are electrically insulated from each other by the insulating transformer 150, even when an electric abnormality, such as current leakage, occurs in the EHC 140, the electric insulation is still ensured between the EHC 140 and the circuit system (PCU 60, first MG 20, and second MG 30 shown in FIG. 1) for driving the vehicle that is electrically connected to the power storage device 70.

The circuit system connected to the power storage device 70 is provided with a current leakage detection circuit 500 for determining whether or not a decrease in insulation resistance has occurred, that is, for detecting the occurrence of current leakage. The current leakage detection circuit 500 detects the decrease in insulation resistance between the power line GL1 electrically connected to the negative electrode of the power storage device 70 and a ground node 5 (typically, a vehicle chassis) of the hybrid vehicle 1.

Figure 4:
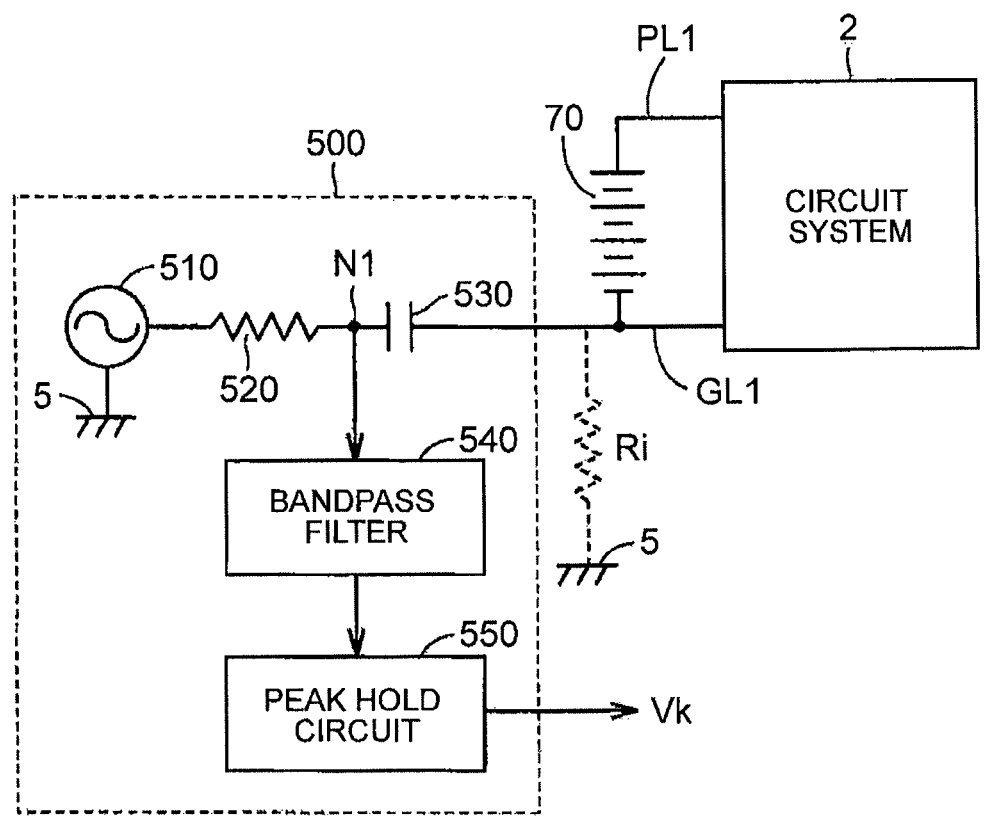
FIG. 4 is a block diagram illustrating the configuration example of the current leakage detection circuit.

FIG. 4 is a block diagram illustrating the configuration example of the current leakage detection circuit. Referring to FIG. 4, the current leakage detection circuit 500 includes an AC power source 510, a resistor 520, a capacitor 530, a bandpass filter 540, and a peak hold circuit 550.

The AC power source 510 and the resistor 520 are connected in series between a node N1 and the ground node 5 (vehicle chassis). The capacitor 530 is connected between the node N1 and the power line GL1 (negative electrode of the power storage device 70). All of the circuits connected to the power storage device 70 are shown as a circuit system 2 in FIG. 4.

In the current leakage detection circuit 500, the AC power source 510 outputs an AC signal of a predetermined frequency, for example, a 2.5 Hz AC signal. The bandpass filter 540 receives the AC signal on the node N1, extracts only the components of the abovementioned predetermined frequency (for example, 2.5 Hz) from the received AC signal, and outputs the extracted component to the peak hold circuit 550.

The peak hold circuit 550 holds the peak of the 2.5 Hz AC signal received from the bandpass filter 540 and outputs the held peak value Vk to the ECU 200. An AC voltage VN1 obtained by dividing the output voltage of the AC power source 510 by the resistor 520 and the insulation resistance (Ri in the figure) is generated in the node N1.

Figure 5:
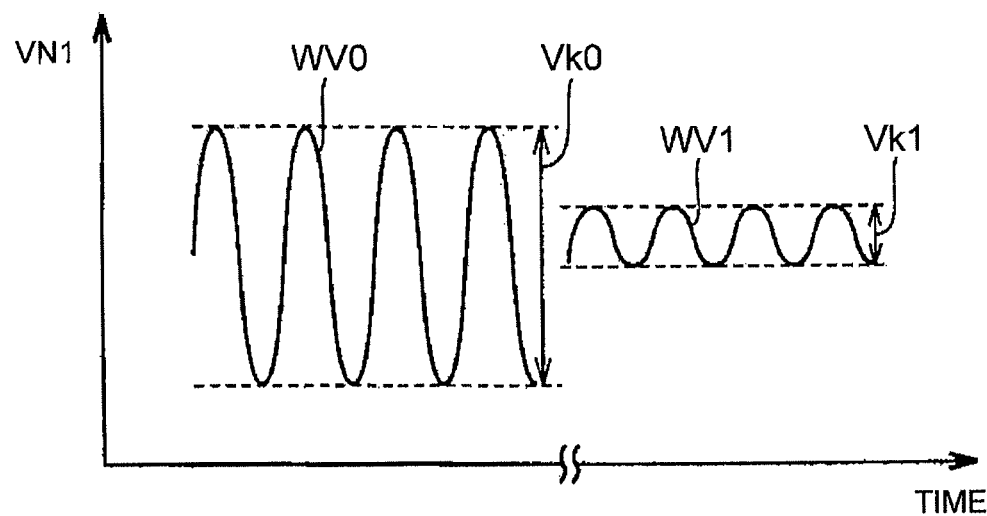
FIG. 5 is a schematic waveform diagram for explaining a method for detecting the decrease (occurrence of current leakage) in insulation resistance with the current leakage detection circuit shown in FIG. 4.

FIG. 5 is a schematic waveform diagram for explaining a method for detecting the decrease (occurrence of current leakage) of insulation resistance with the current leakage detection circuit 500.

Referring to FIG. 5, the AC voltage VN1 outputted by the bandpass filter 540 shows a waveform WV0 when the insulation resistance has not decreased and current leakage has not occurred. In this case, the peak value Vk=Vk0. When Ri=∞, Vk0 is equal to a peak value of the output signal of the AC power source 510.

By contrast, where the insulation resistance decreases, the AC voltage VN1 shows a waveform WV1 of reduced amplitude. Thus, the peak value Vk decreases from Vk0 to Vk1.

Figure 6:
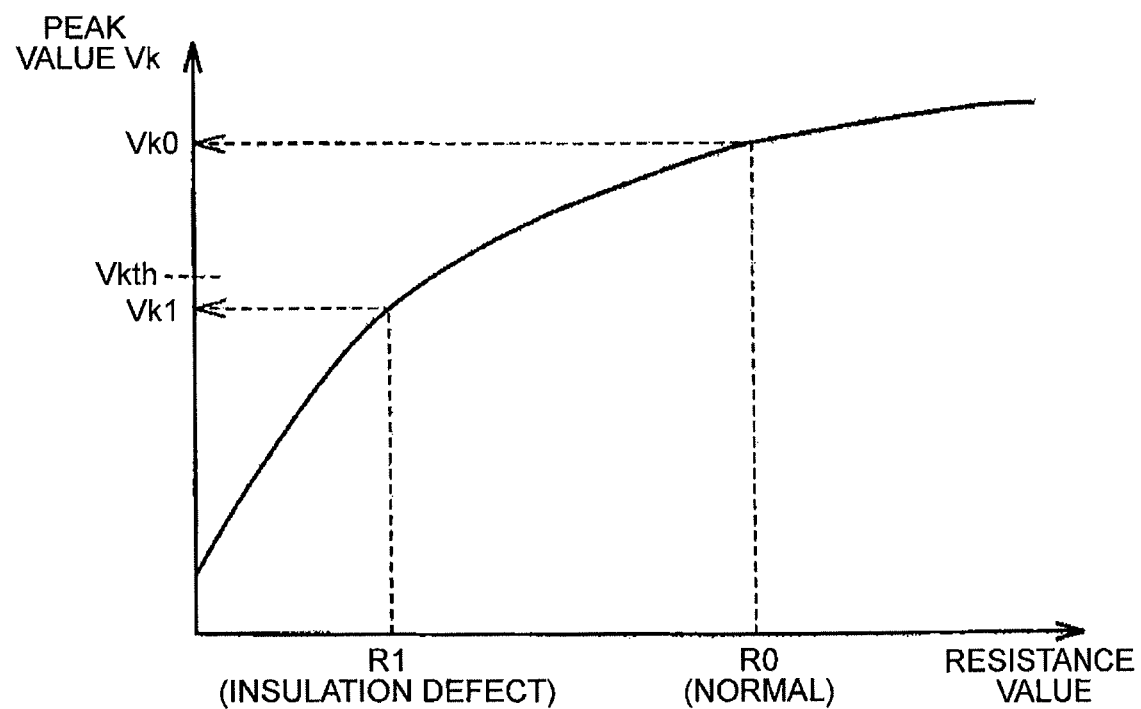
FIG. 6 is a schematic diagram illustrating the relationship between an insulation resistance value and a peak value.

The electric current flowing in the resistor 520 increases and a voltage drop on the resistor 520 increases with the decrease in insulation resistance (Ri). Therefore, as shown in FIG. 6, the peak value Vk changes according to the insulation resistance value. More specifically, the peak value Vk decreases with the decrease in the insulation resistance value.

Therefore, by determining the peak value Vkth corresponding to the lower limit value of insulation resistance that can be allowed, the ECU 200 can detect the decrease in insulation resistance between the power line (power line GL1 in FIG. 3) connected to the current leakage detection circuit 500 and the ground node 5 on the basis of comparison of Vkth with the peak value Vk outputted from the peak hold circuit 550. For example, when Vk<Vkth, it can be detected that current leakage has occurred in the circuit system (power storage device 70 and the circuit system 2) to which the current leakage detection circuit 500 is connected.

Referring again to FIG. 3, in the hybrid vehicle according to the present embodiment, the power supply device 100 further includes a bypass switch S1 for electrically connecting the primary side and secondary side of the insulating transformer 150. The bypass switch S1 is ON/OFF switched according to a control signal SE1 from the ECU 200. The bypass switch S1 can be configured of any switching device that can control the formation and disconnection of an energization path by ON/OFF control, such as a semiconductor relay and a semiconductor switch.

In the example shown in FIG. 3, the bypass switch S1 is connected between the power line 102 connected to the primary coil 151 and the power line 104 connected to the secondary coil 152. Alternatively, the bypass switch S1 may be connected between the power line GL1 and the power line GL2.

The bypass switch S1 is normally OFF. When the bypass switch S1 is OFF, the power supply device 100 operates as an insulting power converter, thereby making it possible to convert the electric power from the power storage device 70 into the energization power of the EHC 140. Meanwhile, by setting OFF the bypass switch S1 when the EHC 140 is not energized, it is possible to form a path in which the EHC 140 is electrically connected to the current leakage detection circuit 500 through the power line GL1. As a result, it is possible to use the current leakage detection circuit 500 to check whether or not the decrease in insulation resistance has occurred in the EHC 140 (will be referred to hereinbelow as "current leakage check").

Figure 7:
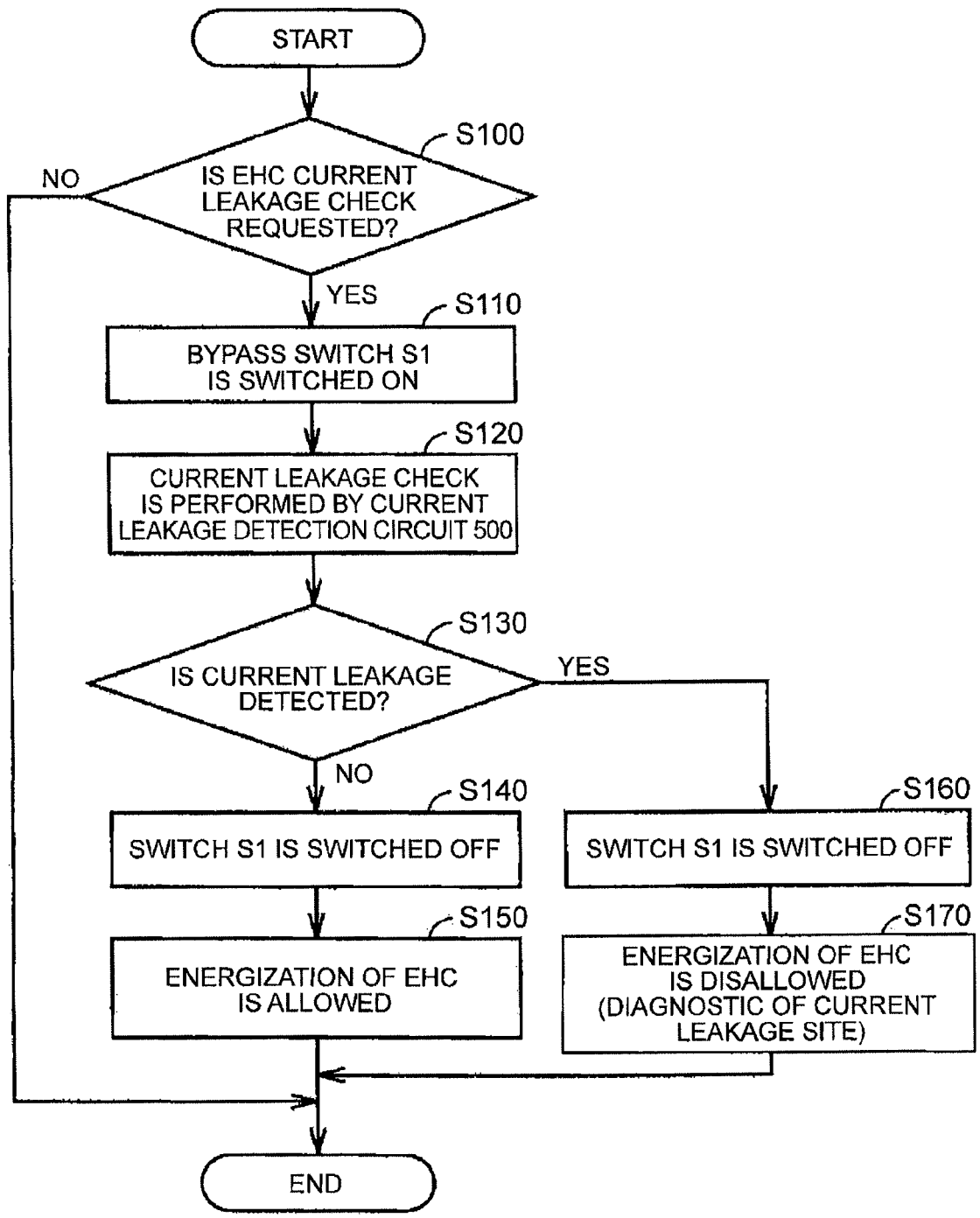
FIG. 7 is a flowchart illustrating the control processing for checking the presence/absence of the decrease (current leakage) in insulation resistance of the EHC in the hybrid vehicle according to Embodiment 1.

FIG. 7 is a flowchart illustrating the control processing for detecting the occurrence of the decrease (current leakage) in insulation resistance of the EHC in the hybrid vehicle according to Embodiment 1. The series of control processing operations shown in FIG. 7 is executed, for example, by the ECU 200.

Referring to FIG. 7, in step S100, the ECU 200 determines whether or not the current leakage check of the EHC 140 has been requested. The current leakage check of the EHC 140 is typically executed when the vehicle starts running, for example, when the ignition switch is turned on. Alternatively, to ensure complete safety, the current leakage check may be executed each time the EHC 140 is energized. When the current leakage check of the EHC 140 has not been requested (NO in S100), the processing is ended. The current leakage check is executed in the non-energized state of the EHC 140.

Where the current leakage check is requested (YES in S100), the ECU 200 switches on the bypass switch S1 in step S110. Thus, the ECU 200 generates a control signal SE1 for switching on the bypass switch S1. As a result, a path is formed by which the EHC 140 is electrically connected to the current leakage detection circuit 500.

In step S120, the ECU 200 checks whether or not the decrease (current leakage) in insulation resistance of the EHC 140 has occurred on the basis of the peak value Vk by using the current leakage detection circuit 500 in a state in which the bypass switch S1 is switched on. The ECU 200 can instantly determine whether or not the current leakage has occurred in the EHC 140 on the basis of the current leakage check result obtained in S120 by verifying with the current leakage detection circuit 500 that the insulation resistance of the circuit system (power line GL1) connected to the power storage device 70 has not decreased before the bypass switch S1 is switched on (step S130).

Where the insulation resistance of the EHC 140 has decreased below a reference level, that is, when current leakage has been detected (YES in step S130), the ECU 200 switches off the bypass switch S1 (step S160) and disallows the energization of the EHC 140 in step S170. As a result, the EHC 140 is not energized even when the energization of the EHC 140 is thereafter requested. In step S170, the ECU 200 may further perform a predetermined diagnostic for specifying the current leakage site in the EHC 140.

Meanwhile, when the insulation resistance of the EHC 140 has not decreased below the reference level, that is, when current leakage has not been detected (NO in step S130), the ECU 200 switches off the bypass switch S1 (step S140) and then allows the energization of the EHC 140 in step S150. Thus, where the energization of the EHC 140 is thereafter requested in response to the decrease in catalyst temperature, the output voltage of the power storage device 70 is converted to the DC voltage Vdc and supplied to the EHC 140 by the power supply device 100.

As described hereinabove, in the hybrid vehicle according to the present embodiment, as a result of providing the bypass switch S1 in the insulating power supply device 100, it is possible to realize the supply of power to the EHC 140 for which the insulation from the power storage device 70 has been ensured and also to share the current leakage detection circuit 500 between the power storage device 70 and the EHC 140. Thus, it is not necessary to provide a current leakage detection circuit dedicated to the EHC 140 in addition to the current leakage detection circuit 500 for the circuit system connected to the power storage device 70. As a result, the increase in the number of circuits can be avoided and the decrease in insulation resistance of the EHC 140 can be efficiently detected.

Further, the configuration of the insulating power supply device 100 described in Embodiment 1 is not limited to the circuit configuration shown by way of example in FIG. 3. Thus, a power supply device of any circuit configuration can be used, provided that power can be supplied to the EHC 140 by using the power from the power storage device 70 upon insulating the power storage device 70 and the EHC 140 by an insulating mechanism, such as a transformer, as long as a bypass switch is used for electrically connecting the primary side (power storage device side) and secondary side (EHC side) of the insulating mechanism.

Embodiment 2

In Embodiment 2, the circuit configuration of an externally chargeable hybrid vehicle is explained as a variation of the power supply system for the EHC.

Figure 8:
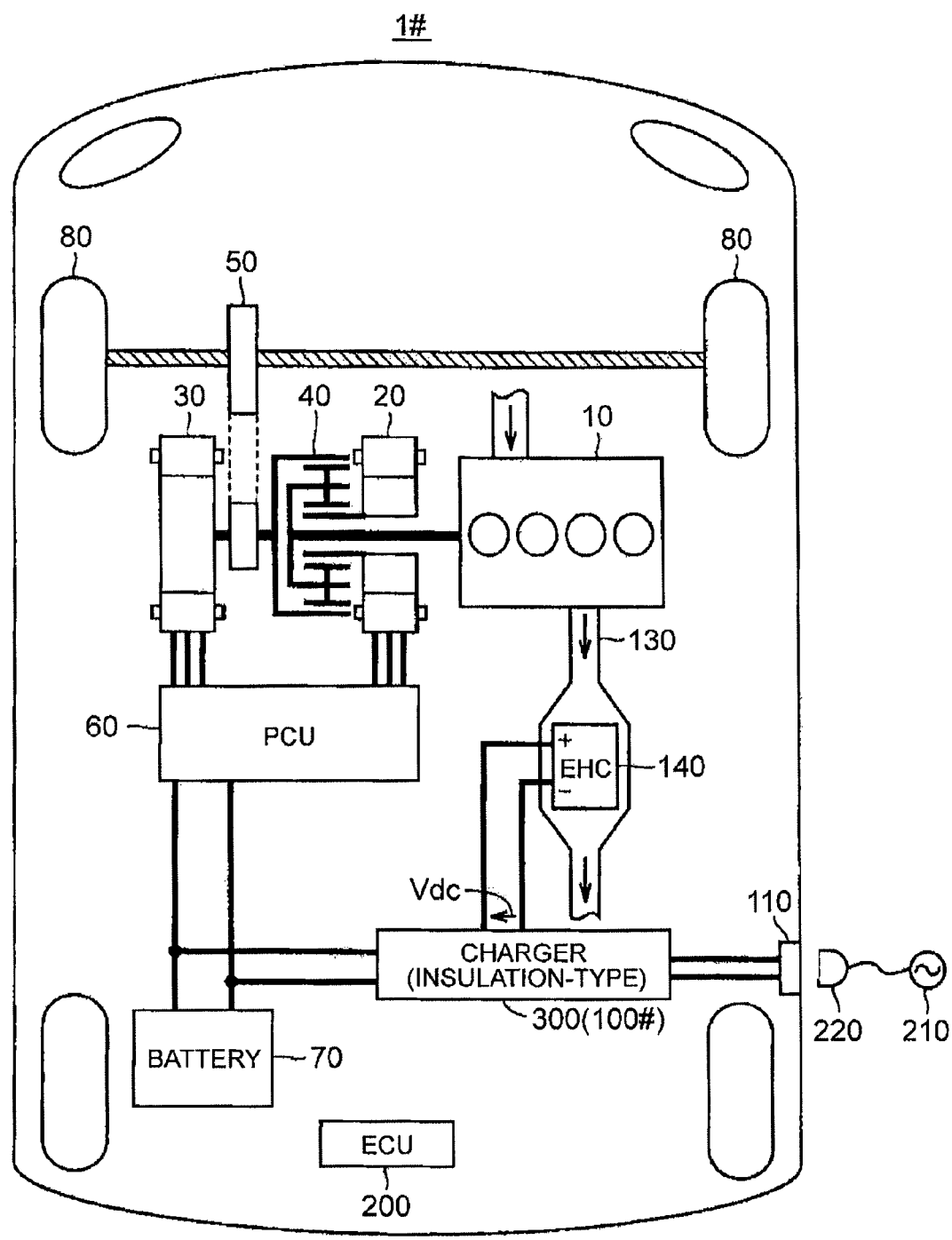
FIG. 8 is a block diagram illustrating the configuration of the hybrid vehicle according to Embodiment 2 of the invention.

FIG. 8 is a block diagram illustrating the configuration of the hybrid vehicle according to Embodiment 2 of the invention.

Referring to FIG. 8, a hybrid vehicle 1# according to Embodiment 2 has a charging port 110 and a charger 300 as components for external charging in addition to the components of the hybrid vehicle 1 shown in FIG. 1.

The charging port 110 is a power interface for receiving power from an external power source 210. During external charging, a connector 220 of a charging cable for supplying power from the external power source 210 to the vehicle is connected to the charging port 110. The configuration in which power is supplied from the external power source to the charging port 110 by electromagnetic coupling between the external power source and the vehicle, that is, in a contactless manner, rather than by electric connection with the cable can be also used. Thus, this description confirms that the mode of supplying power from the external power source 210 to the charging port 110 in the hybrid vehicle 1 is not particularly limited.

The charger 300 is configured by an insulating power converter configured such that the power storage device 70 and the charging port 110 are electrically insulated. The charger 300 has a node electrically connected to the EHC 140. As will be described hereinbelow, a power supply device 100# for supplying the DC voltage Vdc to the EHC 140 is configured using part of the charger 300.

Figure 9:
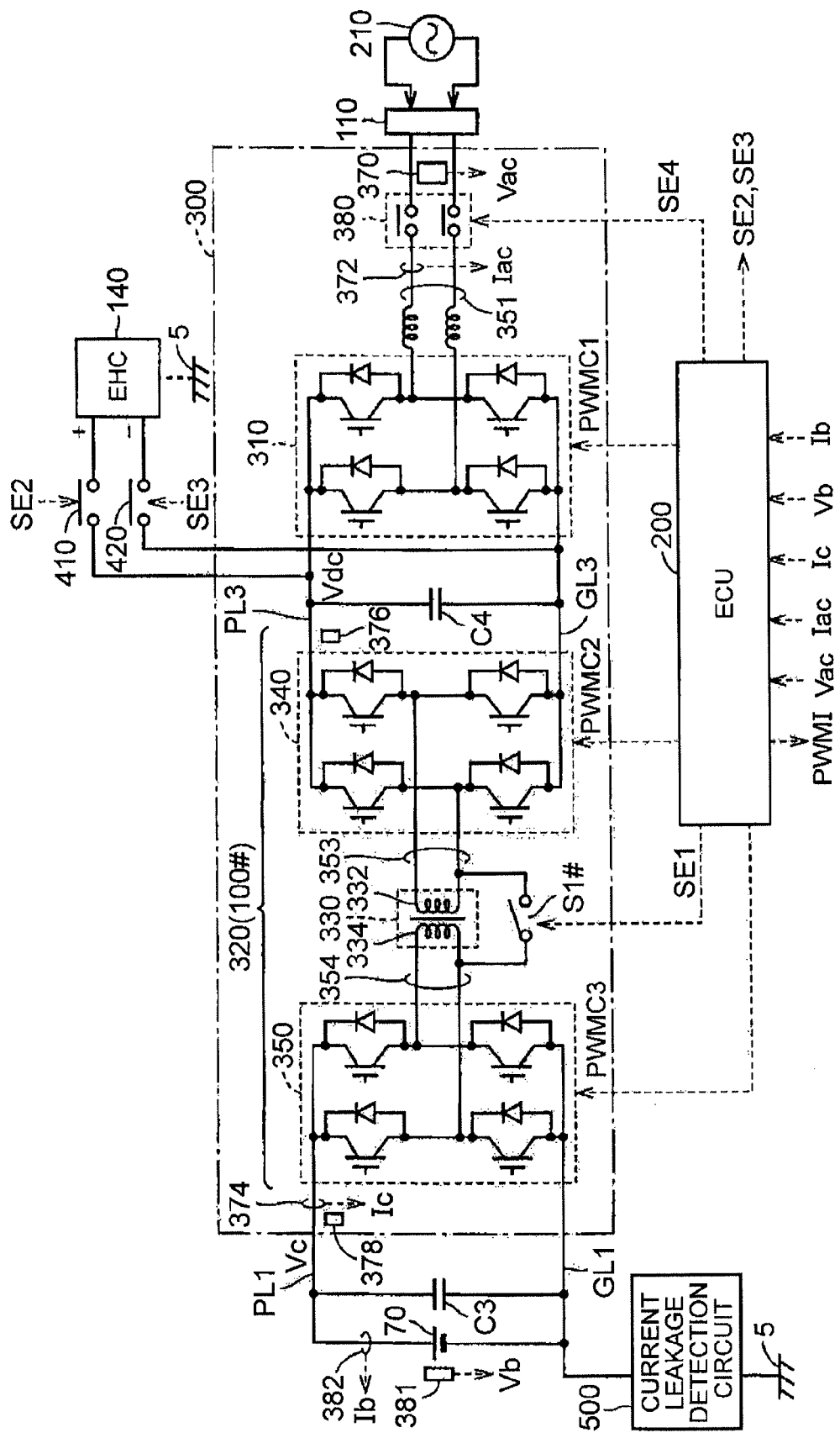
FIG. 9 is a circuit diagram illustrating a configuration example of the charger shown in FIG. 8.

FIG. 9 is a circuit diagram illustrating a configuration example of the charger 300. Referring to FIG. 9, the power storage device 70 is electrically connected between the power lines PL1 and GL1 in the same manner as shown in FIG. 2. Further, the current leakage detection circuit 500 for detecting the decrease in insulation resistance between the power line GL1 and the ground node 5 is provided for the circuit system connected to the power storage device 70.

Referring to FIG. 9, the charger 300 includes an AC/DC converter 310, a DC/DC converter 320, a relay 380, voltage sensors 370, 376, 378, and current sensors 372, 374.

The relay 380 is provided between the charging port 110 and the AC/DC converter 310 and is ON/OFF switched in response to a control signal SE4 from the ECU 200. During the external charging, the AC power is inputted from the external power source 210 to a power line 351 through the relay 380 and the charging port 110. The AC voltage Vac and the AC current Iac of the power line 351 are detected by the voltage sensor 370 and the current sensor 372. The values detected by the voltage sensor 370 and the current sensor 372 are outputted to the ECU 200.

The charger 300 is configured such that during the external charging, the power supplied from the external power source 210 is converted into the charging power of the power storage device 70 on the basis of a control signal from the ECU 200. Further, the charger 300 is configured such that the power is supplied to the EHC 140 during the external charging and also in a state in which no power is supplied from the external power source, including the period in which the vehicle is driven.

The AC/DC converter 310 is constituted by a single-phase full bridge circuit. The DC/DC converter 320 has voltage converters 340, 350, each being constituted by a single-phase full bridge circuit, and an insulating transformer 330.

The AC/DC converter 310 converts the AC power of the power line 351 into DC power on the basis of a control signal PWMC1 from the ECU 200 during the external charging, and outputs the converted power to power lines PL3, GL3. A capacitor C4 is connected between the power lines PL3, GL3. The DC voltage Vdc between the power lines PL3, GL3 is detected by the voltage sensor 376. The value detected by the voltage sensor 376 is outputted to the ECU 200.

For example, the AC/DC converter 310 controls the passing electric current of the reactor that is inserted and connected in the power line 351 by ON/OFF switching the switching elements constituting a full bridge. In this case, the AC/DC converter 310 outputs a DC current to the power line PL3 through the control of the reactor current performed such as to match the current waveform (phase and amplitude) of an AC current Iac with the target current waveform. Further, by matching the phase of the target current waveform with the phase of an AC Vac, it is possible to increase the power factor of the input power from the external power source 210. Further, by adjusting the amplitude of the target current waveform according to the difference between the detected value of the DC voltage Vdc and a target value, it is possible to control the DC voltage Vdc to the target value.

The voltage converter 340 of the DC/DC converter 320 converts the DC voltage outputted from the AC/DC converter 310 to the power lines PL3, GL3 to high-frequency AC power on the basis of a control signal PWMC2 from the ECU 200 during the external charging and outputs the converted power to a power line 353. The power line 353 is connected to the secondary coil 332 of the insulating transformer 330. In the insulating transformer 330 shown in FIG. 9, the coil electrically connected to the power storage device 70 is taken as the primary coil and the coil electrically connected to the charging port 110 (EHC 140) is taken as a secondary coil to ensure compatibility with Embodiment 1.

The insulating transformer 330 has a core constituted by a magnetic material and a primary coil 334 and a secondary coil 332 wound on the core. The primary coil 334 and the secondary coil 332 are electrically insulated from each other. Further, in the insulating transformer 330, a voltage level is converted between the AC voltage of the secondary coil 332 and the AC voltage of the primary coil 334 according to the ratio of the number of turns in the secondary coil 332 and the primary coil 334. The primary coil 334 of the insulating transformer 330 is connected to a power line 354.

The power converter 350 converts the AC power of the power line 354 into DC power on the basis of a control signal PWMC3 from the ECU 200 during the external charging and outputs the converted power to the power lines PL1, GL1. The power lines PL1, GL1 are electrically connected to the positive electrode and negative electrode, respectively, of the power storage device 70. A capacitor C3 is connected between the power lines PL1, GL1.

A voltage sensor 381 and a current sensor 382 for detecting a voltage Vb and a current Ib are disposed in the power storage device 70. The detected voltage Vb and current Ib of the power storage device 70 are outputted to the ECU 200.

A current sensor 374 and a voltage sensor 378 for detecting a DC current Ic and a Dc voltage Vc are disposed in the power lines PL1, GL1. The detected values of the current sensor 374 and the voltage sensor 378 are outputted to the ECU 200.

During the external charging, the charging power (voltage Vc and current Ic) of the power storage device 70 can be controlled by ON/OFF switching the switching elements constituting the voltage converters 340, 350. Thus, the DC/DC converter 320 constituted by the voltage converters 340, 350 and the insulating transformer 330 converts the DC power of the power lines PL1, GL1 into the charging power of the power storage device 70 by a power conversion path passing through the insulating transformer 330.

As a result of the voltage converters 340, 350 being constituted by full bridge circuits capable of bidirectional power conversion, within a period of time in which no external charging is performed, which is inclusive of the period of time in which the vehicle runs, the DC/DC converter 320 can convert the DC power from the power storage device 70 into the DC power outputted to the power lines PL3, GL3 by the power conversion path passing through the insulating transformer 330 by means of power conversion reversed with respect to that performed during the external charging. In this case, the DC voltage Vdc of the power lines PL3, GL3 can be controlled to a target value by ON/OFF switching the switching elements constituting the voltage converters 340, 350. Thus, the DC/DC converter 320 is configured such as to execute the bidirectional DC power conversion between the power storage device 70 and the power lines PL3, GL3.

Further, when no external charging is performed and the vehicle is not driven, the AC/DC converter 310 can also operate so as to convert the DC voltage between the power lines PL3, GL3 into AC power similar to that of the external power source 210 (for example, power supply of commercial grid). In such a case, the power stored by the power storage device 70 can be supplied to the outside of the vehicle by connecting a cable to the charging port 110.

The EHC 140 is electrically connected to the power lines PL3, GL3 in the power conversion path created by the charger 300. The power lines PL3, GL3 are electrically insulated from the power storage device 70 by the insulating transformer 330.

Further, an EHC relay 410 is provided between an EHC 140 and the power line PL3, and an EHC relay 420 is provided between the EHC 140 and the power line GL3. The EHC relays 410, 420 are ON/OFF switched according to control signals SE2, SE3 from the ECU 200. Any switching devices capable of performing ON/OFF control can be used as "shutoff mechanisms" instead of the relays as the EHC relays 410, 420.

The DC voltage Vdc between the power lines PL3, GL3 is supplied to the EHC 140 by switching on the EHC relays 410 and 420. Where the electric resistance of the EHC 140 is denoted by R, the energization power of the EHC 140 is $(Vdc)^2/R$. Thus, by controlling the DC voltage Vdc, it is possible to control the energization power that determines the amount of heat generated by the EHC 140.

Thus, the charger 300 can energize the EHC 140 by the DC voltage Vdc outputted between the power lines PL3, GL3 in the course of converting the power from the external power source 210 to the charging power of the power storage device 70 during the external charging. In particular, by controlling the DC power conversion performed by the DC/DC converter 320, it is possible to convert the DC voltage Vdc suitable for energizing the EHC 140 into the charging voltage Vc and charging current Ic for adequately charging the power storage device 70. Thus, during the external charging, the power can be supplied in parallel to the EHC 140 and the power storage device 70 by using the same charger 300, and the power supplied to the two devices can be controlled by the AC/DC converter 310 and the DC/DC converter 320, respectively.

Further, during the non-external charging, the charger 300 converts the output voltage of the power storage device 70 into the DC voltage Vdc for energizing the EHC 140 by actuating the DC/DC converter 320 and outputs the converted voltage between the power lines PL3, GL3. As a result, even when the power from the external power source 210 cannot be used (typically when the vehicle runs), the EHC 140 can be energized by the power of the power storage device 70. In this case, the energization power of the EHC 140 can be easily controlled by controlling the DC voltage Vdc with the DC/DC converter 320. Thus, during the non-external charging, the charger 300 can supply power to the EHC 140 by power conversion from the power storage device 70 to the power lines PL3, GL3, which is part of reverse conversion with respect to the power conversion from the charging port 110 to the power storage device 70 realized during the external charging.

Further, a bypass switch S1# for electrically connecting the primary side and secondary side of the insulating transformer 330 is provided in the DC/DC converter 320 in the charger 300. The bypass switch S1# is switched ON/OFF in response to the control signal SE1 from the ECU 200, in the same manner as the bypass switch S1 shown in FIG. 3. Similarly to the bypass switch S1, the bypass switch S1# can be configured by any switching device.

In the example shown in FIG. 9, the bypass switch S1# is connected between the power line 353 connected to the secondary coil 332 and the power line 354 connected to the primary coil 334. Alternatively, the bypass switch S1# may be connected between the power line GL1 and the power line GL3.

By switching on the bypass switch S1# and the EHC relays 410, 420, it is possible to form a path in which the EHC 140 is electrically connected to the current leakage detection circuit 500 through the power line GL1. As a result, the current leakage check of the EHC 140 can be performed using the current leakage detection circuit 500 in the same manner as in Embodiment 1.

In FIG. 9, the DC/DC converter 320 in the charger 300 can energize the EHC 140 by the power from the power storage device 70 after the EHC 140 has been electrically insulated from the power storage device 70. Further, by providing the bypass switch S1#, it is possible to share the current leakage detection circuit 500 between the EHC 140 and the power storage device 70. Thus, the DC/DC converter 320 can be interpreted as configuring a power supply device 100# having the same function as the power supply device 100 shown in FIG. 3.

Further, by switching off the EHC relays 410 and 420, it is possible to disconnect the EHC 140 electrically from both power lines PL3, GL3. Therefore, even if an electrical abnormality such as current leakage occurs in the EHC 140, the EHC 140 can be electrically insulated from the power conversion path for external charging in the charger 300.

FIG. 10 is a diagram illustrating the control of the EHC relays 410, 420 and the bypass switch S1# in the charger 300 in different vehicle states.

Referring to FIG. 10, during the external charging, the bypass switch S1# is switched off, and the charger 300 executes power conversion via the insulating transformer 330 between the external power source 210 and the power storage device 70.

When the EHC 140 operates during the external charging, the EHC relays 410, 420 are switched on. As a result, the DC voltage Vdc outputted from the AC/DC converter 310 between the power lines PL3, GL3 is supplied to the EHC 140. In this case, the target value of the DC voltage Vdc can be set to a voltage value corresponding to the adequate energization power enabling the EHC 140 to demonstrate sufficiently the functions thereof. Thus, in the charger 300, the AC/DC converter 310 controls the energization power of the EHC 140, whereas the DC/DC converter 320 controls the charging power of the power storage device 70.

Meanwhile, when the EHC 140 is inactive during the external charging, the EHC relays 410, 420 are switched off. As a result, the power from the external power source 210 is converted into the charging power of the power storage device 70 by the AC/DC converter 310 and the DC/DC converter 320, without feeding the power to the EHC 140. In this case, the target value of the DC voltage Vdc can be set to a value suitable for the external charging.

The bypass switch S1# is essentially switched OFF also when the vehicle runs. When the EHC 140 operates, the EHC relays 410, 420 are switched on, and the DC/DC converter 320 controls the DC voltage Vdc. As a result, the EHC 140 is energized.

Meanwhile, when the EHC 140 is inactive, the EHC relays 410, 420 are switched off, and both the AC/DC converter 310 and the DC/DC converter 320 are stopped, that is, the entire charger 300 is stopped.

The current leakage check of the EHC 140 is performed when the EHC 140 is inactive. During the external charging, the current leakage check can be performed as a preparation for actuation of the EHC 140 when the vehicle will run after the external charging is completed.

During the current leakage check of the EHC 140, the bypass switch S1# and the EHC relays 410, 420 are switched on in a state in which both the AC/DC converter 310 and the DC/DC converter 320 are stopped. As a result, the EHC 140 is electrically connected to the current leakage detection circuit 500 through the power line GL1 by a path in which the insulating transformer 330 is bypassed.

Therefore, the current leakage check of the EHC 140 can be also performed using the current leakage detection circuit 500 in the hybrid vehicle 1#. Further, by using the configuration of the charger 300, it is possible to convert the power from the power storage device 70 or the external power source 210 into the energization power of the EHC 140.

Thus, in the hybrid vehicle according to Embodiment 2, by using part of the insulating charger 300 for external charging, it is possible to realize the supply of power to the EHC 140, for which the insulation from the power storage device 70 has been ensured, and also to share the current leakage detection circuit 500 between the power storage device 70 and the EHC 140. Thus, since it is not necessary to provide anew a current leakage detection circuit dedicated to the EHC 140, the increase in the number of circuits can be avoided and the decrease in insulation resistance of the EHC 140 can be efficiently detected, in the same manner as in Embodiment 1.

Further, in the present embodiment, a hybrid vehicle of a series/parallel type is described in which the power of the engine 10 can be divided by the power division device 40 and transmitted to the drive wheels 80 and the first MG 20, but the invention can be also applied to a hybrid vehicle of the so-called parallel type in which the wheels are driven by an engine and a motor, without providing a power division device.

Further, the charger 300 described in Embodiment 2 functions as an example of the "charger" in the invention. The configuration of the charger 300 is not limited to the example shown in FIG. 9, and any circuit configuration can be used, provided that power conversion is performed after electrically insulating the power storage device 70 and the charging port 110 by using an insulating mechanism (transformer) and that a bypass switch is provided for electrically connecting the primary side and secondary side of the insulating transformer.

In the explanation above, the engine 10 functions as an example of the "internal combustion engine" in the invention, the power storage device 70 functions as an example of the "power storage device" in the invention, and the second MG 30 functions as an example of the "motor-generator" in the invention. Further, the EHC 140 functions as an example of the "electrical heated catalyst device" in the invention, and the bypass switches S1, S1# functions as an example of the "switching device" in the invention. Further, the current leakage detection circuit 500 functions as an example of the "current leakage detection circuit" in the invention. The insulating transformers 150 and 330 functions as an example of the "insulating mechanism" in the invention.

The charging port 110 functions as an example of the "power receiving section" in the invention, and the EHC relays 410, 420 functions as an example of the "first cutoff mechanism" and "second cutoff mechanism", respectively, in the invention. The power lines PL3, GL3 functions as an example of the "first power line" and "second power line", respectively, in the invention. Further, the DC/DC converter 320 functions as an example of the "first power conversion unit" in the invention, and the AC/DC converter 310 functions as an example of the "second power conversion unit" in the invention.

The processing of steps S150 and S170 in FIG. 7 are examples for functioning as the "allowing unit" and "prohibiting unit" of the invention.

The embodiments disclosed herein are exemplary embodiments in all of the aspects thereof and should not be considered to be limiting. The scope of the invention is shown by the claims, rather than by the explanation above, and is intended to include all the meanings equivalent to the claims and all the changes that do not depart from the claims.

The invention can be applied to hybrid vehicles provided with an EHC in the exhaust passage of an internal combustion engine.

What is claimed is:

1. A hybrid vehicle equipped with an internal combustion engine and a motor-generator for running the vehicle, comprising:
    a power storage device that stores electric power to be supplied to the motor-generator;
    a current leakage detection circuit for detecting a decrease in insulation resistance, the current leakage detection circuit being electrically connected to a negative electrode of the power storage device;
    an electrical heated catalyst device for electrically heating a catalyst purifying exhaust gas discharged from the internal combustion engine; and
    a power supply device for converting electric power from the power storage device into energization power of the electrical heated catalyst device by a power conversion path passing through an insulating mechanism configured such that electric energy is transferred after a primary side electrically connected to the power storage device and a secondary side electrically connected to the electrical heated catalyst device have been electrically insulated, wherein
    the power supply device includes a switching device for electrically connecting the primary side and the secondary side of the insulating mechanism to each other, and the switching device is opened when the electrical heated catalyst device is energized, and is closed to function as a bypass switch when current leakage check is requested in order to detect when the decrease in insulation resistance of the electrical heated catalyst device occurs.

2. The hybrid vehicle according to claim 1, further comprising:
    a testing unit for verifying whether or not the insulation resistance has decreased by the current leakage detection circuit in an ON state of the switching device when the presence/absence of the decrease in insulation resistance of the electrical heated catalyst device is requested to be checked; and
    a prohibiting unit for prohibiting the energization of the electrical heated catalyst device by the power supply device when the decrease in insulation resistance was detected by the testing unit.

3. The hybrid vehicle according to claim 1, further comprising:
    a testing unit for verifying whether or not the insulation resistance has decreased by the current leakage detection circuit in an ON state of the switching device when the presence/absence of the decrease in insulation resistance of the electrical heated catalyst device was requested to be checked; and
    an allowing unit for allowing the energization of the electrical heated catalyst device by the power supply device when the decrease in insulation resistance is not detected by the testing unit.

4. A hybrid vehicle equipped with an internal combustion engine and a motor-generator for running the vehicle, comprising:
    a power storage device that stores electric power to be supplied to the motor-generator;
    a power receiving unit that receives electric power supplied from a power source located outside the vehicle;
    an electrical heated catalyst device for electrically heating a catalyst purifying exhaust gas discharged from the internal combustion engine;
    a current leakage detection circuit for detecting a decrease in insulation resistance, the current leakage detection circuit being electrically connected to a negative electrode of the power storage device; and
    a charger for performing AC/DC power conversion by which power received by the power receiving unit is converted into charging power of the power storage device when power is supplied from the power source, by a power conversion path passing through an insulating mechanism configured such that electric energy is transferred after a primary side electrically connected to the power receiving unit and a secondary side electrically connected to the power storage device have been electrically insulated, wherein
    the charger includes first and second power lines that are electrically connected to the primary side of the insulating mechanism and the electrical heated catalyst device on the power conversion path, a DC voltage being outputted between the first and second power lines, a first power conversion unit for converting the power from the power storage device into the DC voltage to be outputted to the first and second power lines by partial reverse conversion with respect to the AC/DC power conversion in a case in which the electrical heated catalyst device is actuated when no power is supplied from the power source, and a switching device for electrically connecting the primary side and the secondary side of the insulating mechanism to each other to function as a bypass switch when a current leakage check is requested in order to detect when a decrease in insulation resistance occurs during a non-energized period of the electrical heated catalyst device.

5. The hybrid vehicle according to claim 4, further comprising:
    a first cutoff mechanism disposed between the first power line and the electrical heated catalyst device; and
    a second cutoff mechanism disposed between the second power line and the electrical heated catalyst device.

6. The hybrid vehicle according to claim 4, wherein the first power conversion unit is configured to perform bidirectional power conversion between the power storage device and the first and second power lines, and the charger further includes a second power conversion unit that converts the AC power received by the power receiving unit into DC power and outputting the DC power between the first and second power lines so as to control the DC voltage between the first and second power lines to a target voltage, when power is supplied from the power source.

7. The hybrid vehicle according to claim 6, wherein the charger controls power supplied to the electrical heated catalyst device by controlling the DC voltage between the first and second power lines with the first power conversion unit, and controls charging power of the power storage device with the second power conversion unit, in a case in which the electrical heated catalyst device is actuated when the power storage device is charged by the power source.

* * * * *